US008020916B2

(12) United States Patent  (10) Patent No.: US 8,020,916 B2
Bunsmann et al. (45) Date of Patent: Sep. 20, 2011

(54) CONVERTIBLE VEHICLE WITH A ROOF THAT IS CAPABLE OF OPENING SEPARATELY

(75) Inventors: Winfried Bunsmann, Bissendorf (DE); Klaus Russke, Bissendorf (DE)

(73) Assignee: Wilhelm Karmann GmbH, Munich (DE)

( * ) Notice: Subject to any disclaimer, the term of this patent is extended or adjusted under 35 U.S.C. 154(b) by 452 days.

(21) Appl. No.: 11/721,869

(22) PCT Filed: Dec. 6, 2005

(86) PCT No.: PCT/DE2005/002191
§ 371 (c)(1),
(2), (4) Date: Jul. 8, 2009

(87) PCT Pub. No.: WO2006/063557
PCT Pub. Date: Jun. 22, 2006

(65) Prior Publication Data
US 2009/0273210 A1 Nov. 5, 2009

(30) Foreign Application Priority Data
Dec. 16, 2004 (DE) .......................... 10 2004 060 504

(51) Int. Cl.
*B60J 10/10* (2006.01)
(52) U.S. Cl. ................................. 296/107.2; 296/216.05
(58) Field of Classification Search ............. 296/216.01, 296/220.01, 223, 107.2, 216.04, 216.05
See application file for complete search history.

(56) References Cited

U.S. PATENT DOCUMENTS

| | | | |
|---|---|---|---|
| 3,960,403 A * | 6/1976 | Carella et al. ................. | 296/222 |
| 4,801,174 A | 1/1989 | Hirshberg et al. | |
| 4,852,938 A | 8/1989 | Hirshberg et al. | |
| 4,953,910 A | 9/1990 | Maekawa et al. | |
| 4,995,667 A | 2/1991 | Tamura et al. | |
| 5,078,447 A | 1/1992 | Klein et al. | |
| 5,325,585 A | 7/1994 | Sasaki et al. | |
| 5,791,728 A | 8/1998 | Hausrath | |
| 2001/0033089 A1 * | 10/2001 | Maass ....................... | 296/107.07 |
| 2005/0173946 A1 | 8/2005 | Grimm et al. | |

FOREIGN PATENT DOCUMENTS
DE 3930343 3/1991
(Continued)

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.; Douglas L. Wathen

(57) ABSTRACT

The invention relates to a convertible vehicle with at least two roof sections; that, when the roof is closed, are situated one behind the other with regard to the direction of travel (F), of which, when roof section that is situated behind the other section when the roof is closed, at least one separately openable part of the or a roof section, which is situated in front of roof section, can be displaced with a component pointing toward the rear, and the convertible vehicle is ready to be driven when the roof sections are in this position. The convertible vehicle is designed in such a manner that the or each separately openable part, when in its closed position, extends in a transversal direction (q) of the vehicle up to the outer edge of the respective roof section, abuts against at least one upper edge of a side window and at least when closed, is supported on a longitudinal beam placed in the vicinity of a vertical longitudinal center plane (E) of the vehicle and between the windshield frame and a rear roof section.

18 Claims, 19 Drawing Sheets

FOREIGN PATENT DOCUMENTS

| | | |
|---|---|---|
| DE | 4203229 | 8/1993 |
| DE | 19704846 | 8/1998 |
| DE | 10211860 | 10/2003 |
| JP | 03114952 | 5/1991 |

* cited by examiner

CONVERTIBLE VEHICLE WITH A ROOF THAT IS CAPABLE OF OPENING SEPARATELY

REFERENCE TO RELATED APPLICATIONS

This application is the United States national phase of Patent Cooperation Treaty application No. PCT/DE05/002191, filed Dec. 6, 2005, which claims priority to German patent application No. DE10 2004 060504.1, filed Dec. 16, 2004, the entire content of both of which are incorporated herein by reference.

FIELD OF THE INVENTION

The present invention relates generally to a convertible vehicle comprising at least one roof part capable of opening separately.

BACKGROUND OF THE INVENTION

DE 102 11 860 B4 shows a closed vehicle structure having a large sunroof which can be moved rearwardly on two longitudinal guide rails fixed to the car body and disposed next to one another over a fixed roof structure with an unmoving rear window. When the sunroof is open in this case, only a moderate feeling of open air results which corresponds more to a vehicle comprising two plate parts removable from the fixed roof above the driver's seat and the front passenger seat.

A convertible vehicle is known from DE 42 03 229 C2 which includes a rear roof portion comprising a rear window and one or two roof portions disposed in front thereof in the direction of travel when the roof is closed. The front roof portions each have a part which is central with respect to the transverse direction of the vehicle, which is capable of opening separately and which is laterally bordered by longitudinal frames. To open such a part, it can be displaced toward the rear. In this connection, the laterally outwardly arranged longitudinal frames serve, as with a conventional sunroof, as guides for the central part, and thus remain unmoved. The feeling of open air is thereby impaired and the impression results for the occupants more of a large sunroof than that of an opening in the manner of a Targa-like vehicle. The lateral longitudinal frames can only be removed from this position with a complete opening of the roof in the manner of a convertible vehicle. However, measures relating to the rear roof part are first required for this purpose which can only be carried out when the vehicle is stationary; for example, the upward pivoting of a rear cover, the pivoting of the rear window or similar. In addition, the moving part of the front roof portion is moved beneath the roof portion respectively located to the rear thereof, which restricts the headroom of the occupants.

It is the problem underlying the invention to improve convertible vehicles comprising, in addition to the complete roof opening, an additional separate opening possibility of at least one roof part with respect to the opening of the roof part to be opened separately.

SUMMARY OF THE INVENTION

According to one aspect of the invention, a convertible vehicle is provided with at least two roof portions which are sequential with respect to the direction of travel in the closed roof position and of which at least one part, capable of opening separately of the or of one front roof portion arranged in front thereof, can be displaced with a rearwardly facing component with a closed rear roof portion and a travel condition of the convertible vehicle is formed in the displaced position. The or each part capable of opening separately extends in its closed position in the transverse direction of the vehicle up to the outer edge of the respective roof portion and is supported by at least one side member disposed in the region of a vertical longitudinal central plane of the vehicle and between the windshield frame and a rear roof portion.

According to another aspect of the invention, a convertible vehicle having a windshield and a passenger compartment adjacent to the windshield includes a roof having first and second roof portions movable to a closed position in which the roof portions extend over the passenger compartment. The first roof portion extends between the windshield and the second roof portion in the closed position. A support member is disposed along a substantially longitudinal central plane of the vehicle and extends longitudinally between the windshield and the second roof portion. The support member supports the first roof portion in the closed position and guides movement of the first roof portion between the closed position and an open position disposed along an outer surface of the second roof portion. The support member further has one end pivotally coupled to the second roof portion for movement of the support member between an extended position extending between the windshield and second roof portion and a retracted position disposed along an inner surface of the second roof portion.

The feeling of open air is already substantially improved with only an open part of a front roof portion due to the design in accordance with the invention. The part which can be opened separately extends directly up to the upper edge of closed side windows. With open side windows, the open space can therefore then extend from a window breastline of the door up to far above the heads of the occupants without any interruption. This partial opening can be carried out during the journey. Since the or each part capable of opening is supported at least in its closed state at one or more side member(s) disposed in the region of a vertical longitudinal central plane of the vehicle and between the windshield frame and a closed rear roof portion, with the exception of said central side member, no component disturbing the feeling of open air is required inside the space which is taken up, when the part capable of opening is closed, by the roof portion supporting it. A stable holding and guidance of the part capable of opening separately is nevertheless made possible. In addition, the roof can also be opened overall for the setting of a convertible position.

In any case, the side member can be moved in with respect to the rear roof part for this purpose in order to enable a complete roof opening.

The complete roof opening can advantageously be initiated from the already open position of the front roof part. The roof opening time then still required for the complete opening is very short.

Instead of a single side member, two narrow side members can, for example, also be disposed closely next to one another in the region of the longitudinal central plane of the vehicle.

The guidance of the part capable of opening can be realized in an uncomplicated manner if its front end is movably supported at the side member in its closed state and if its rear end is movably supported via at least one holder disposed close to its transverse outer edge at a roof portion disposed to the rear thereof. The front holder counteracts a forward tilting of the part; the rear holders counteract a tilting around the longitudinal axis of the vehicle. Dispensing with lateral longitudinal frame parts of the front roof portion is facilitated by this support of the part capable of opening at least three points.

A complete transfer of the front holder in a completely open position to a roof portion disposed to the rear thereof also makes possible the roof opening with a completely open separate part without there being any risk of canting or blocking.

In this connection, the side member can be inwardly pivotable around an axis disposed transversely to the vehicle during the opening of the total roof for stowing in the rear part of the convertible vehicle with respect to a roof portion disposed to the rear thereof and can thus be supported in the space anyway present due to an arching of the rear roof portion in the vehicle center without any restriction of the trunk with a stowed roof. The inward pivoting of the side member can take place simultaneously with the opening of the rear roof portion so that the time period for the roof opening is not increased. Moreover, the headroom of the occupants does not have to be restricted by the simultaneous movement. The fact also contributes to this that the side member is only movable between the occupants in the vertical central plane. It is in particular favorable for a space-saving storage of the completely open roof when, with a configuration of the roof with precisely two sequential roof portions, the longitudinal extent of the side member is smaller than the vertical extent of the rear roof portion. The side member and the rear roof portion can then be stored parallel to one another and in a space-saving manner without the side member projecting beyond the roof portion.

In an advantageous configuration, the roof can be opened in total both with an open part and with a closed part, which increases the flexibility.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
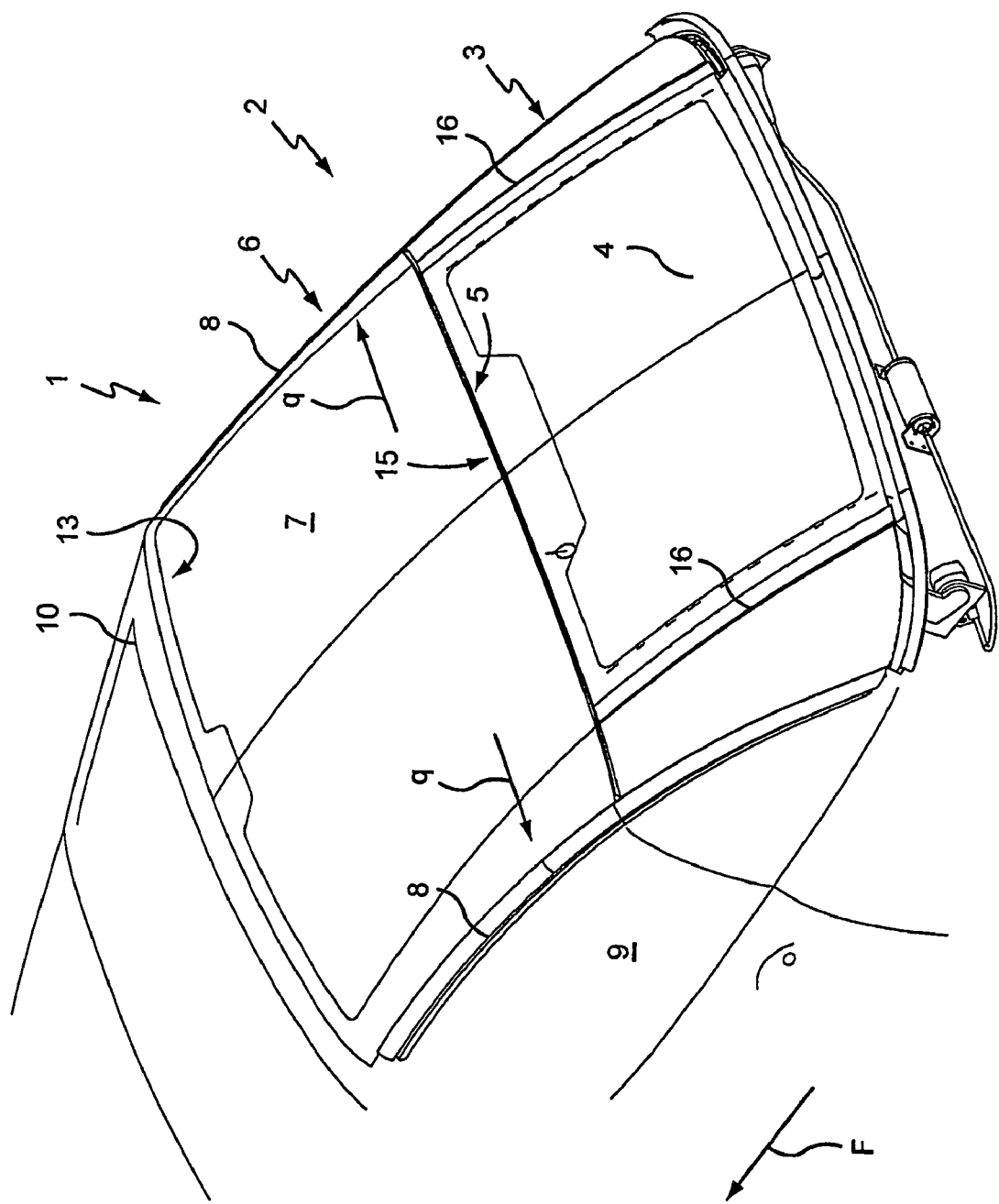
FIG. 1 is a partly broken away representation of a motor vehicle in accordance with the invention in a perspective view from obliquely behind and above with two sequential roof portions in a closed position.
Figure 2:
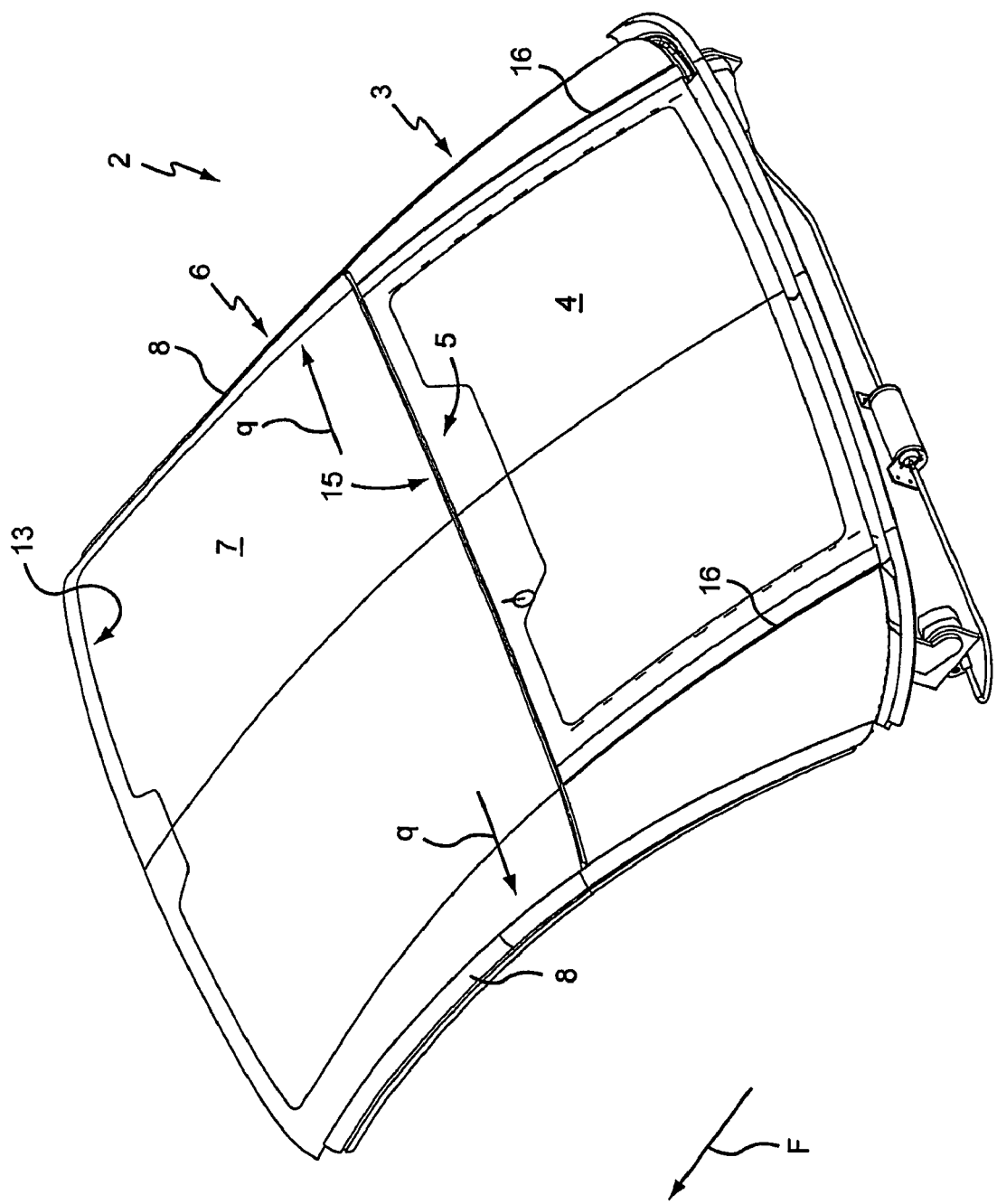
FIG. 2 is the roof in accordance with FIG. 1 in a separately drawn representation.
Figure 3:
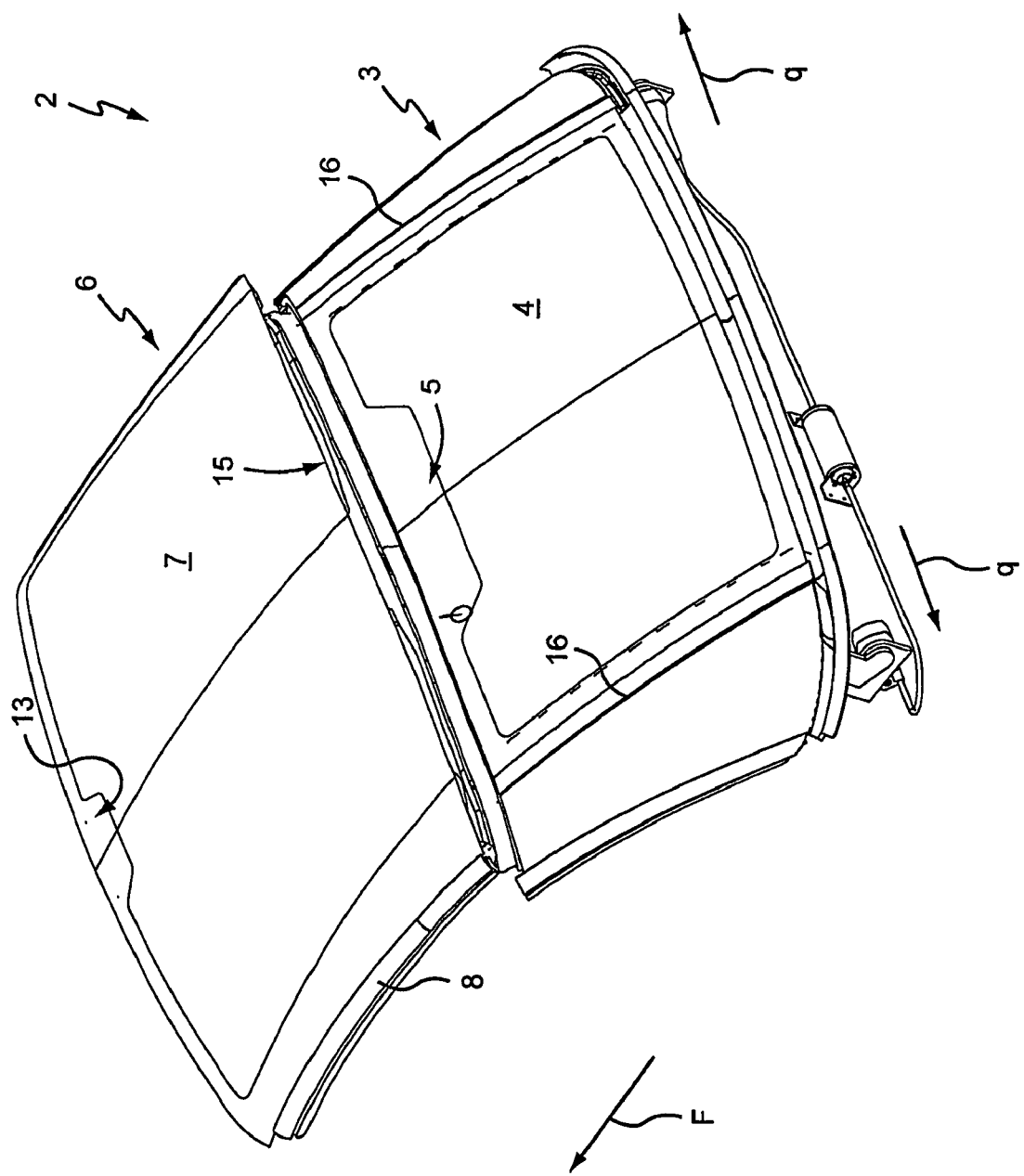
FIG. 3 is a similar view to FIG. 2 with a starting opening of the part capable of opening separately.

Referring to FIG. 1, a vehicle in accordance with one embodiment of the invention is generally indicated at 1. Illustratively, the vehicle is shown as a two-seater with a single row of seats, though it should be readily appreciated that the vehicle may have two or more rows of seats. The vehicle 1 includes a roof that is generally indicated at 2. The roof 2 is capable of opening completely, on the one hand, for the generation of a full convertible position and is capable of opening partly, on the other hand, for the generation of an intermediate position.

In the illustrated embodiments, the closed roof 2 (FIG. 1) includes precisely two roof portions sequentially in the longitudinal direction of the vehicle, namely a rear roof portion 3 comprising a rear window 4 and a further roof portion 6 directly adjoining the front edge 5 of the rear roof portion 3 in the closed position thereof and disposed at the front in the direction of travel F. Alternatively, in particular with four seaters and multiple seats, a plurality of roof portions can also be arranged in front of the rear roof portion 3. The front roof portion 6 is disposed substantially horizontally above the passenger compartment in the closed state. The two roof portions 3, 6 here can be made from different materials, for instance metal, glass or plastic materials. They can in particular be configured to be substantially transparent so that a good spatial feeling is also produced with a closed roof 2. Both roof portions 3, 6 are movable.

The front roof portion 6 comprises at least one plate-shaped part 7, and is capable of opening separately. The plate part 7 extends over the total passenger compartment width of the vehicle 1 and has an outer edge 8 that is disposed in the transverse direction q of the vehicle and is directly adjacent the upper edges of lateral windows 9, provided that they are closed.

Figure 8:
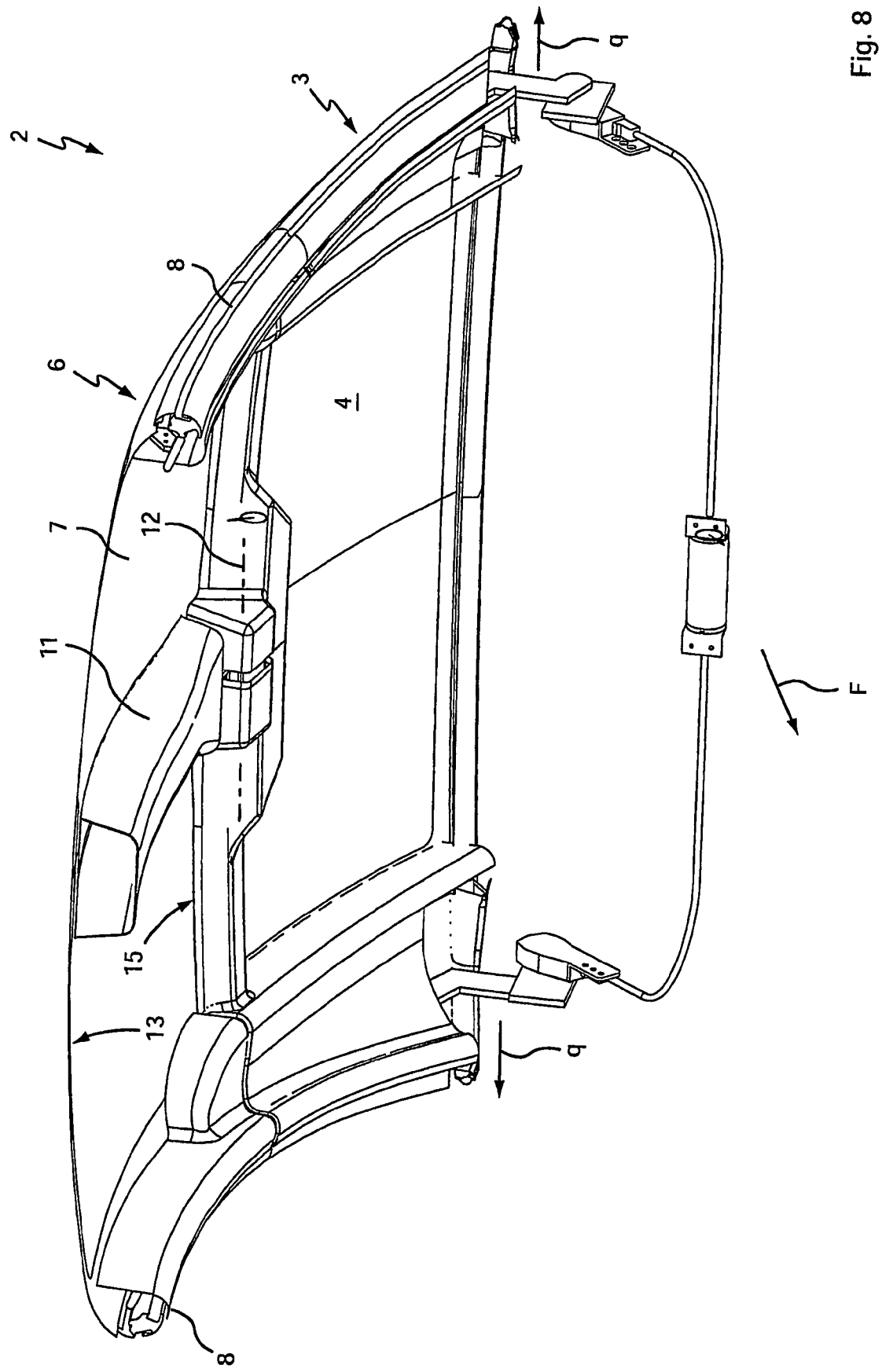
FIG. 8 is the roof in the position of FIG. 2 in a view seen from below from the direction of the passenger compartment of the vehicle.
Figure 9:
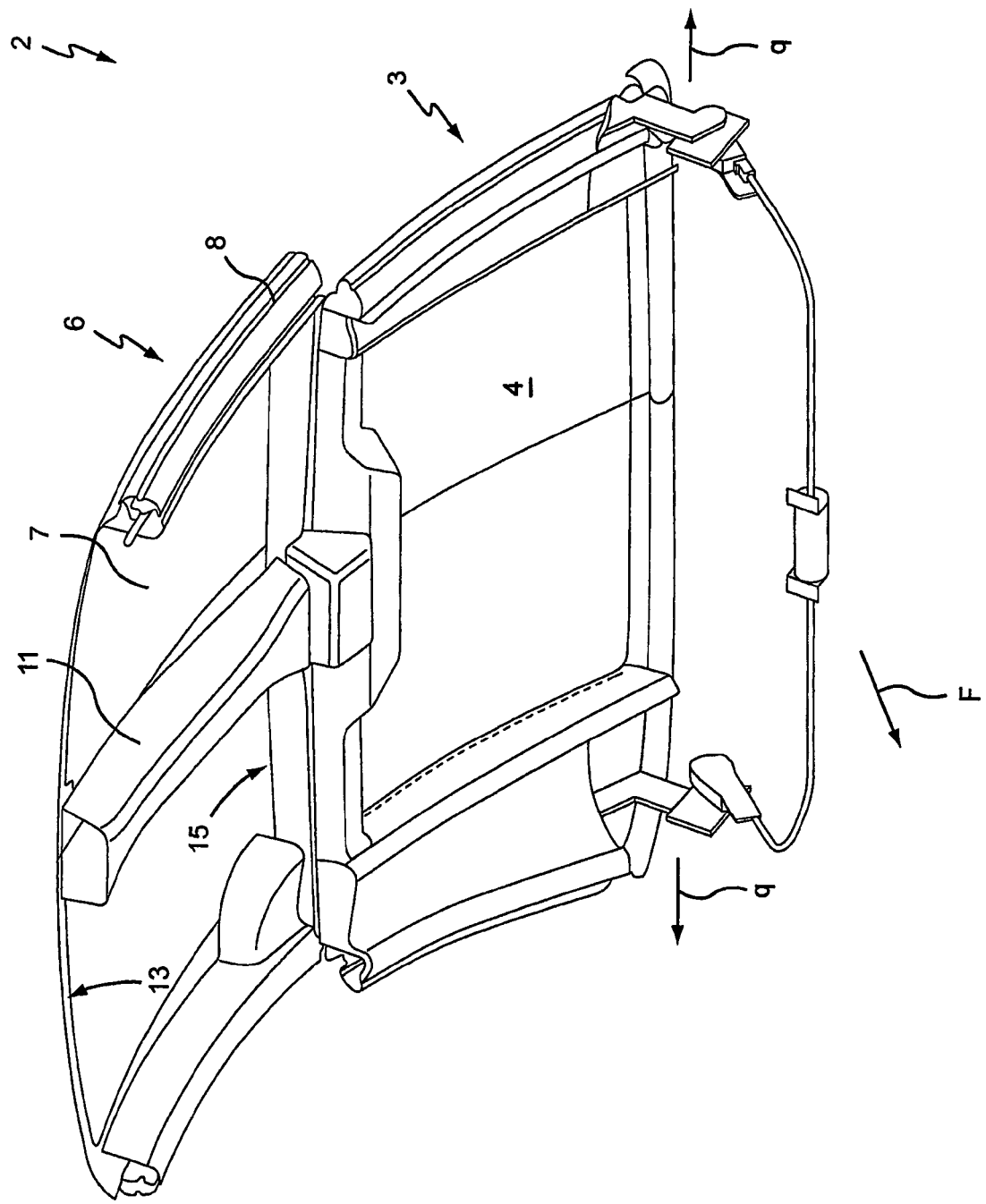
FIG. 9 is a similar view to FIG. 8 with a starting opening of the part capable of opening separately.
Figure 10:
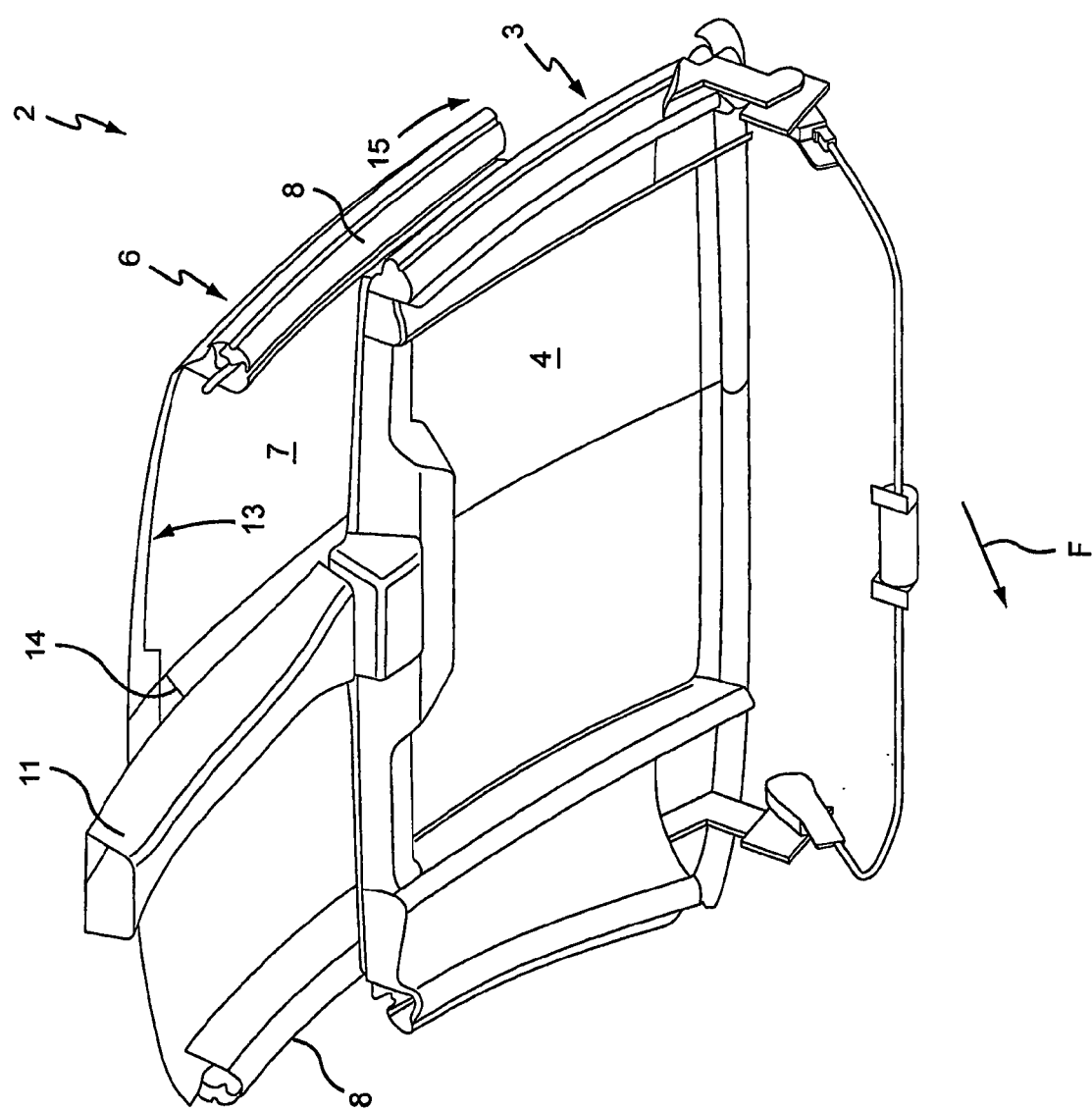
FIG. 10 is a similar view to FIG. 9 during the further progressing opening of the part.
Figure 11:
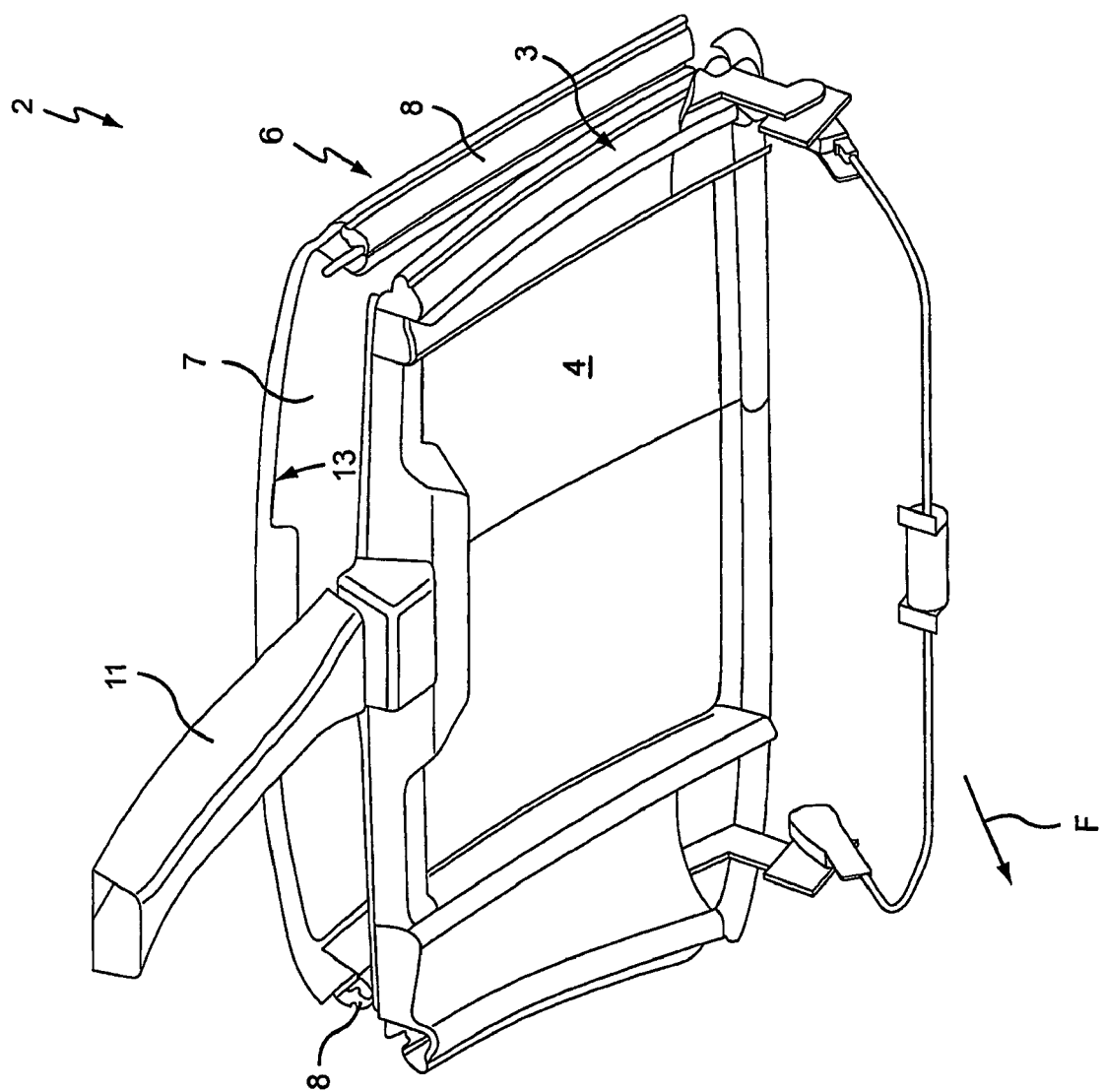
FIG. 11 is a similar view to FIG. 10 with an open part and a still closed rear roof portion.
Figure 12:
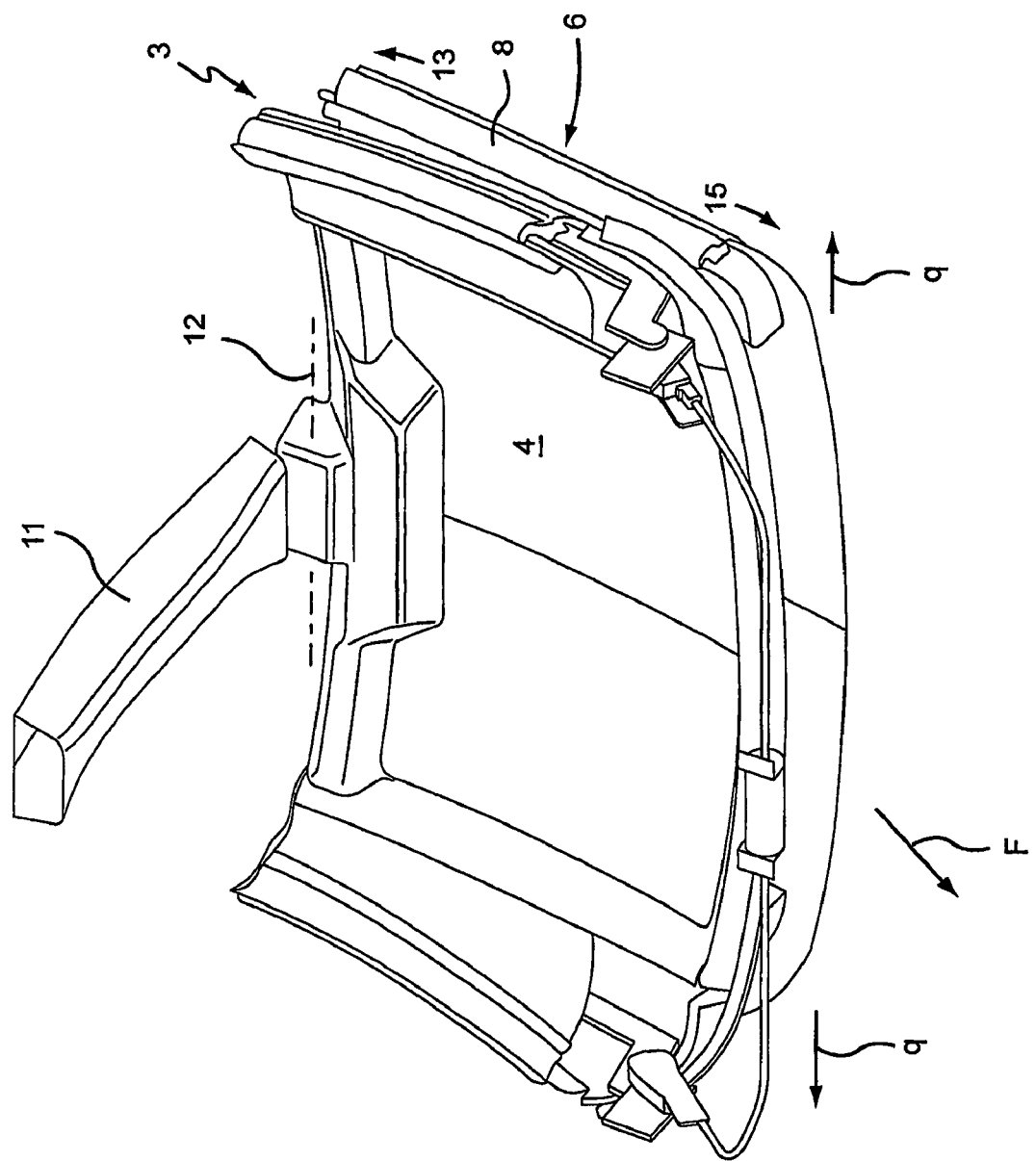
FIG. 12 is a similar view to FIG. 11 during the opening of the rear roof portion and the inward pivoting of the side member with respect thereto for the generation of a full convertible roof position.
Figure 13:
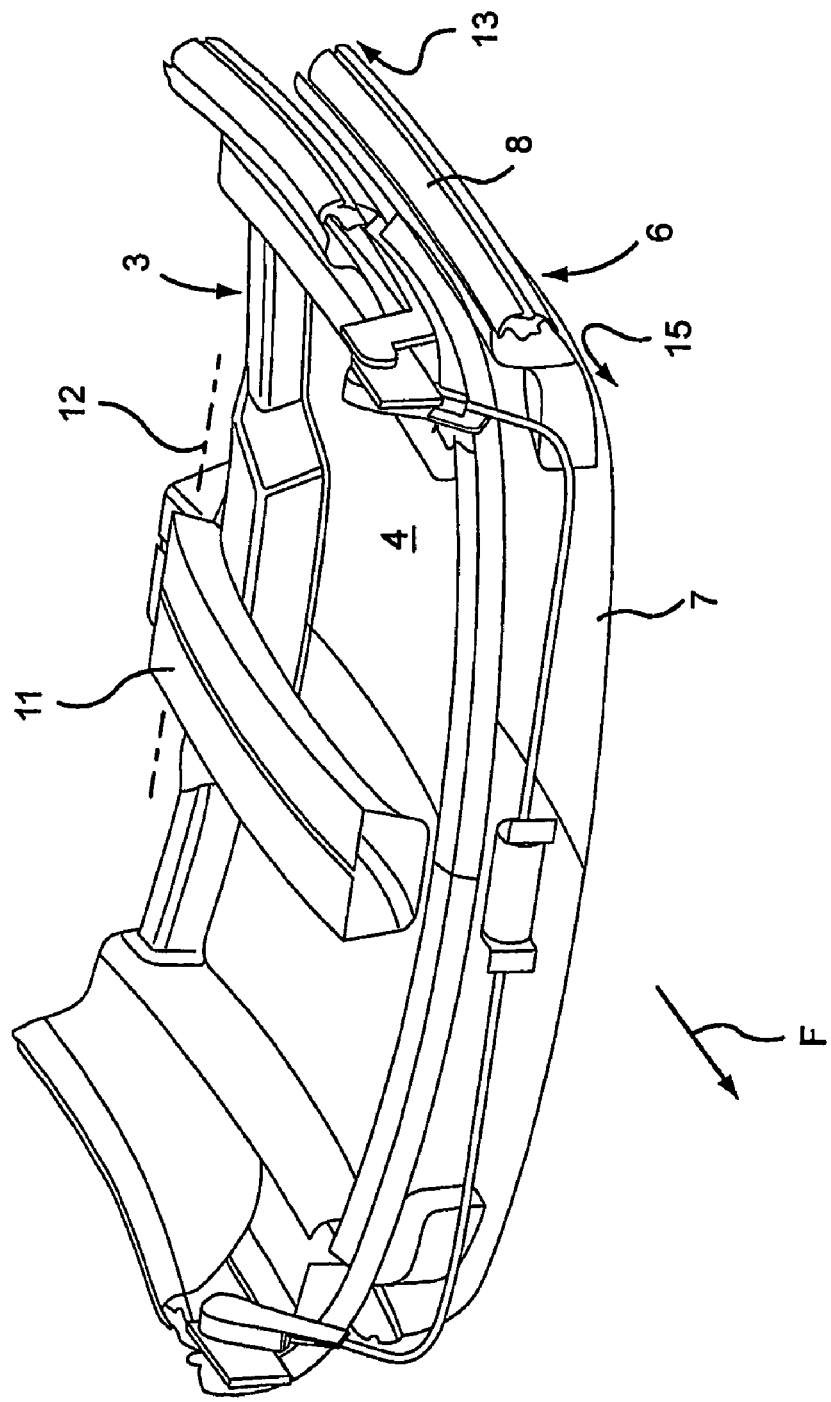
FIG. 13 is a similar view to FIG. 12 with a completely stowed roof with a rear roof portion and side member supported parallel to one another.
Figure 14:
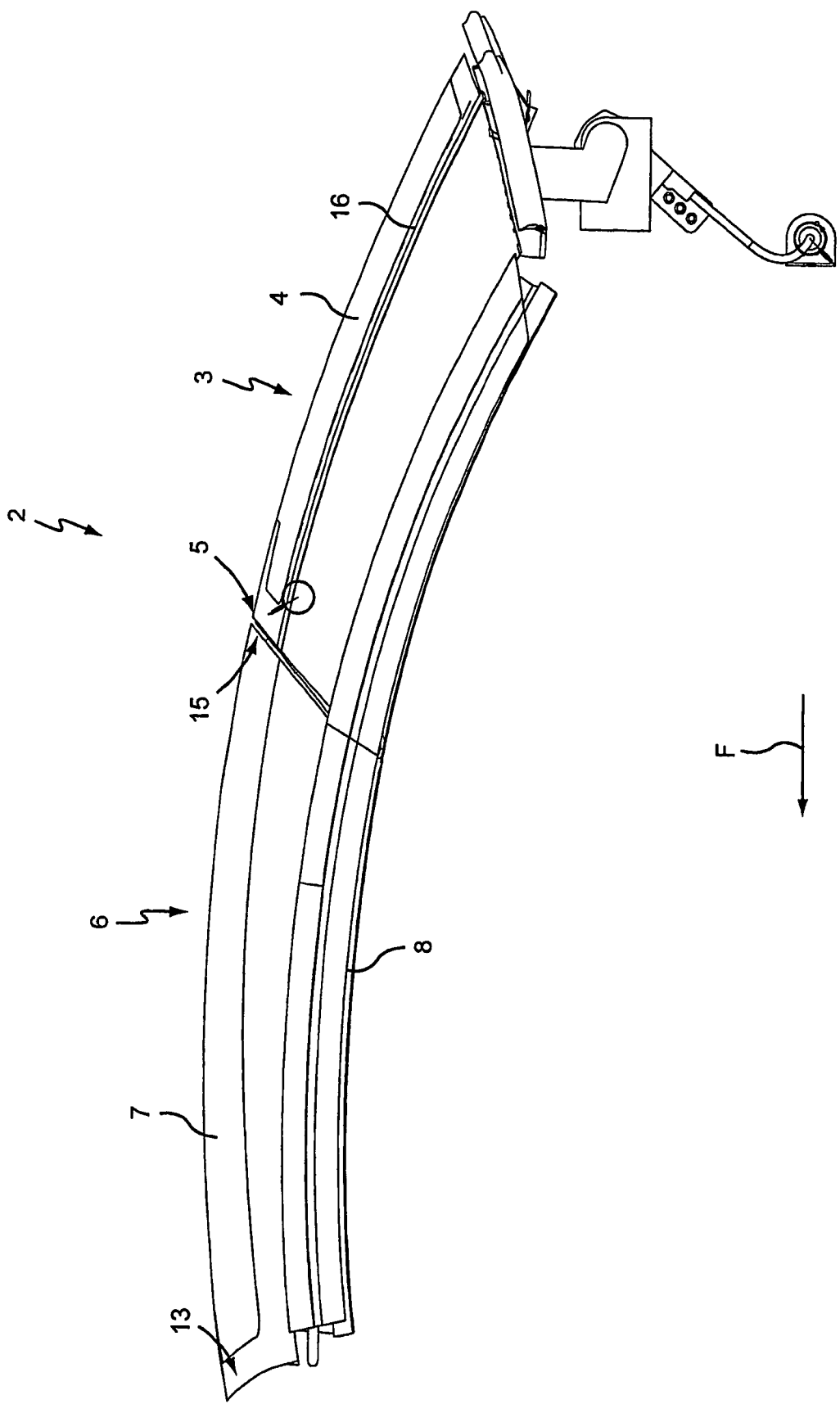
FIG. 14 is the roof in the position of FIG. 2 in a view seen from below from the direction of the passenger compartment of the vehicle.
Figure 15:
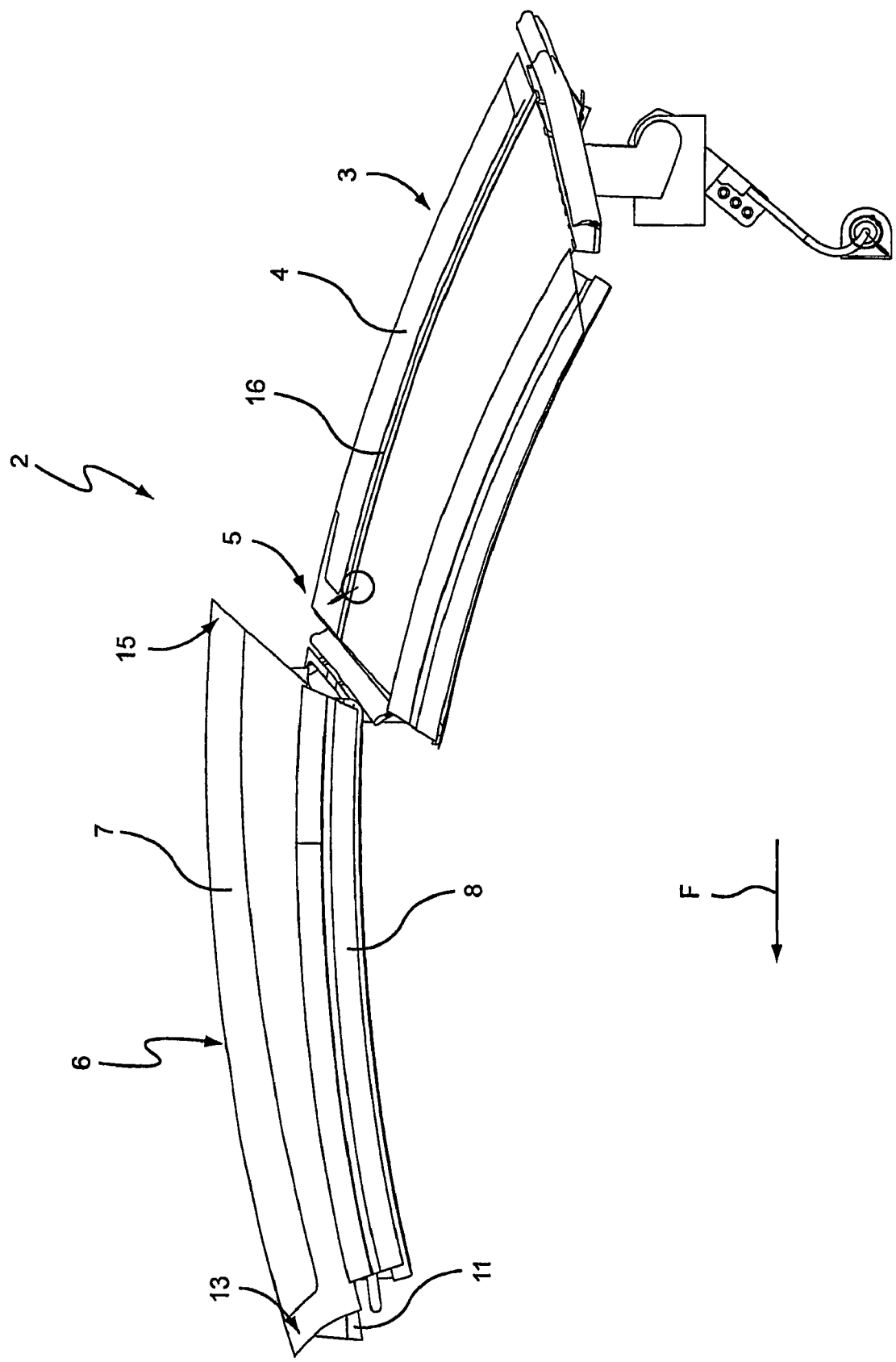
FIG. 15 is a similar view to FIG. 14 with a starting opening of the part capable of opening separately.
Figure 16:
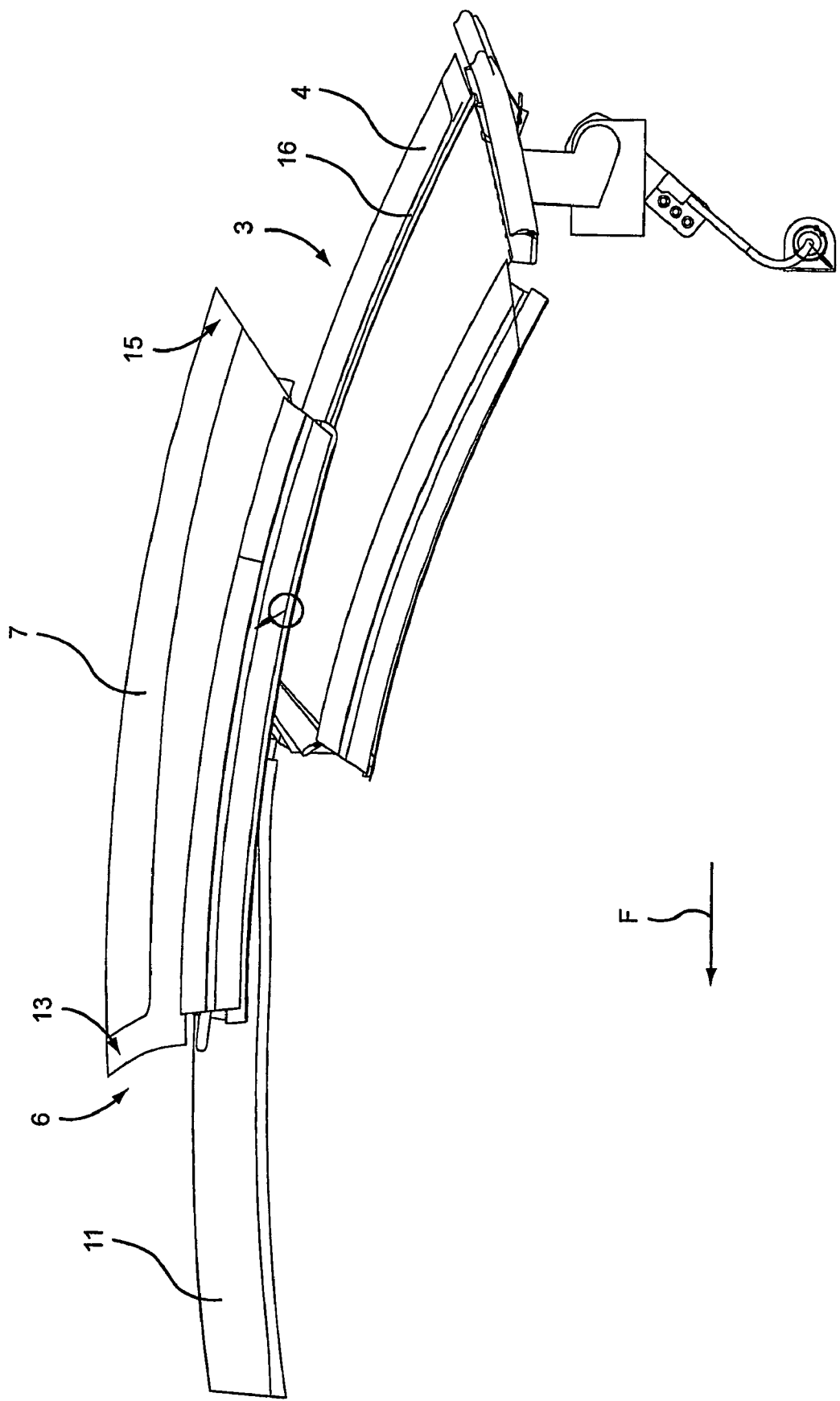
FIG. 16 is a similar view to FIG. 15 during the further progressing opening of the part.
Figure 17:
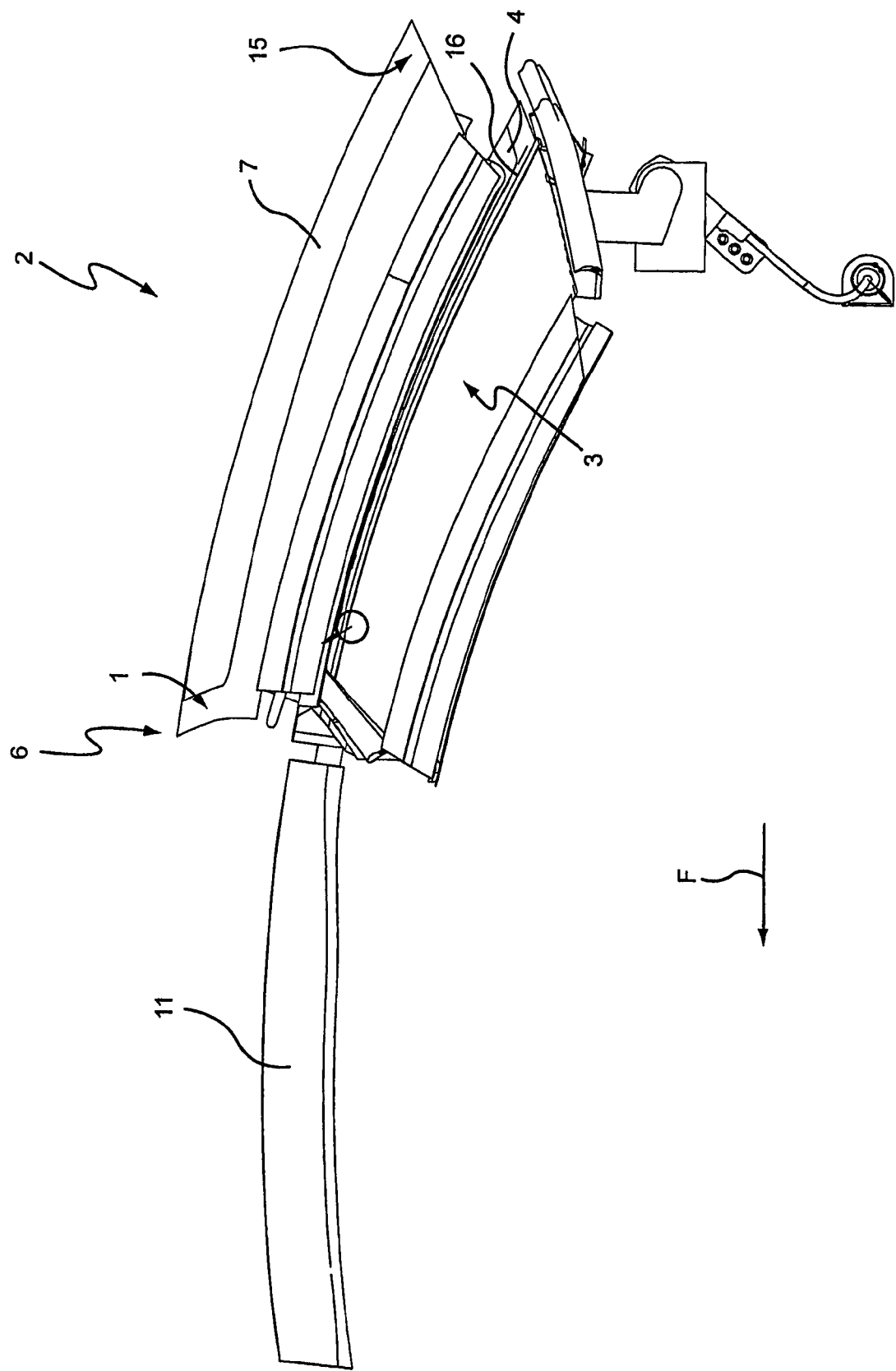
FIG. 17 is a similar view to FIG. 16 with an open part and a still closed rear roof portion.
Figure 18:
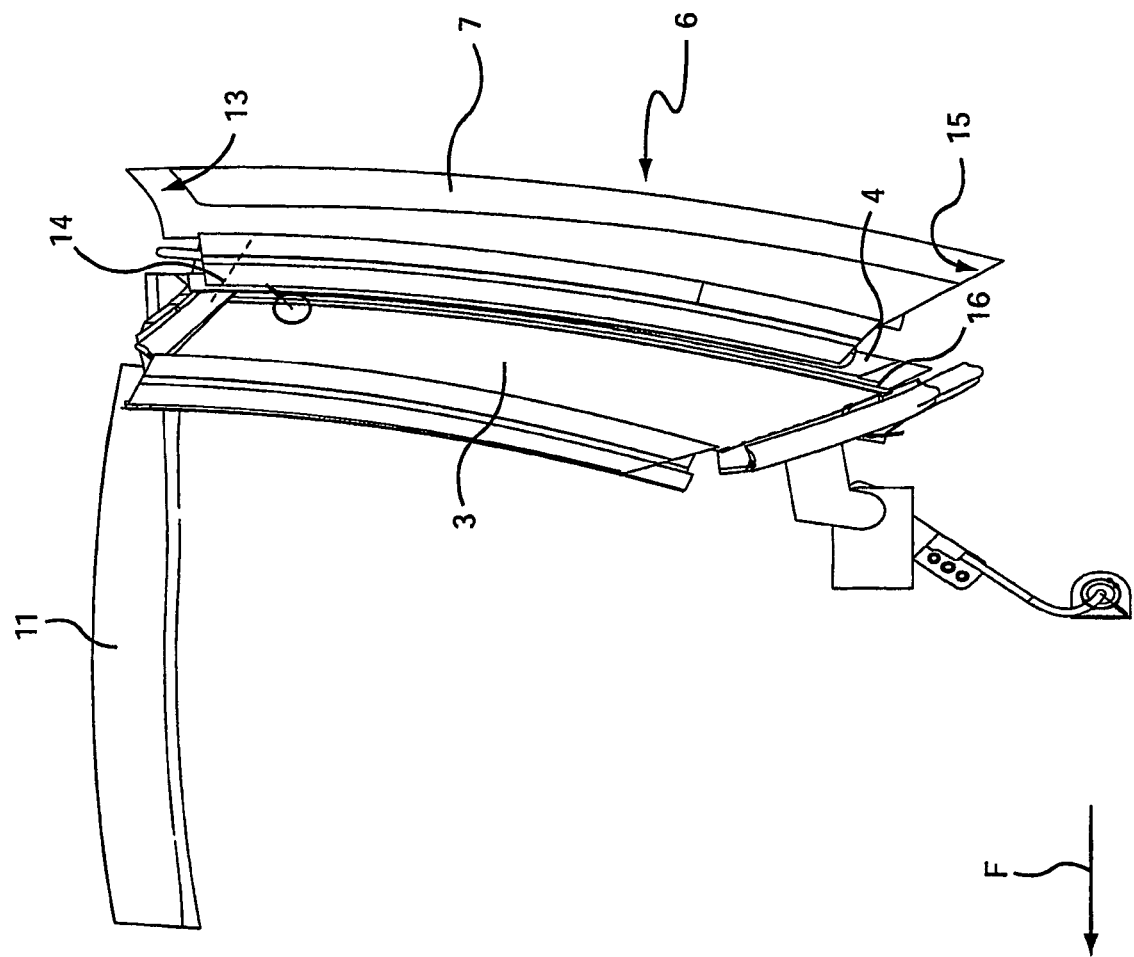
FIG. 18 is a similar view to] FIG. 17 during the opening of the rear roof portion and of the inward pivoting of the side member with respect thereto for the generation of a full convertible roof position.
Figure 19:
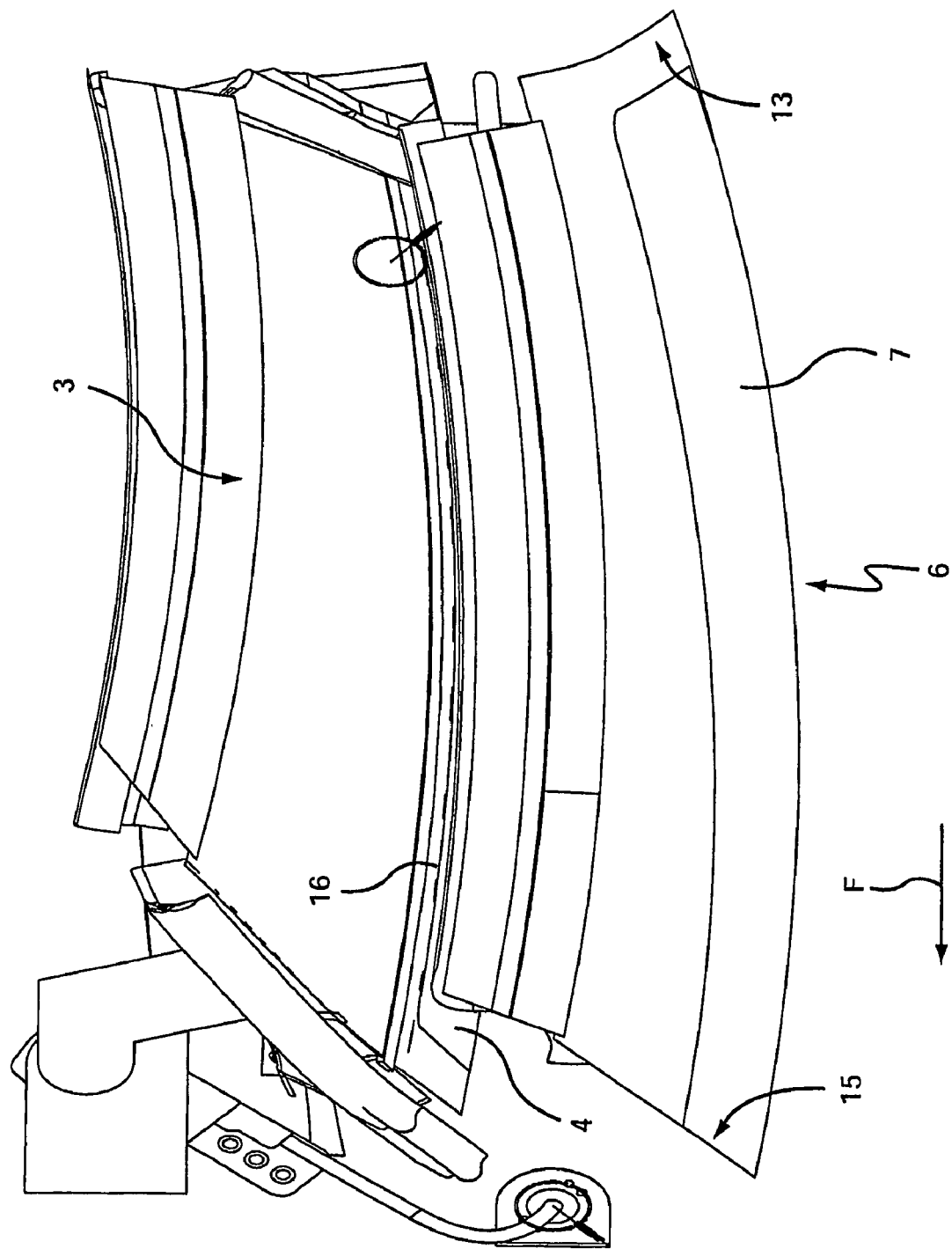
FIG. 19 is a similar view to FIG. 18 with a completely stowed roof with a rear roof portion and side member supported parallel to one another.

The plate part 7 which is capable of opening engages in its closed position (e.g. FIG. 1) over a side member 11. The side member 11 is held indirectly or directly releasably at a windshield frame 10 and is pivotably hinged to the rear roof portion 3 around a horizontal axis 12 (FIG. 8) disposed transversely to the vehicle 1 in its rear end disposed opposite the direction of travel F. A separate drive, for instance an electric motor, can be provided for driving the side member 11 around this axis 12, or this pivot movement can be coupled to the main drive for the stowing movement of the rear roof portion 3. Both movements can in any case run simultaneously.

The front end 13 of the plate part 7 is guided at the side member 11 via at least one holder 14 in the closed position and in the only slightly open position. Two holders next to one another at the side member 11 are also possible for tilt stabilization. Its rear end 15 is, in contrast, guided in transversely outwardly disposed guide tracks 16 at the rearward roof portion 3.

Figure 4:
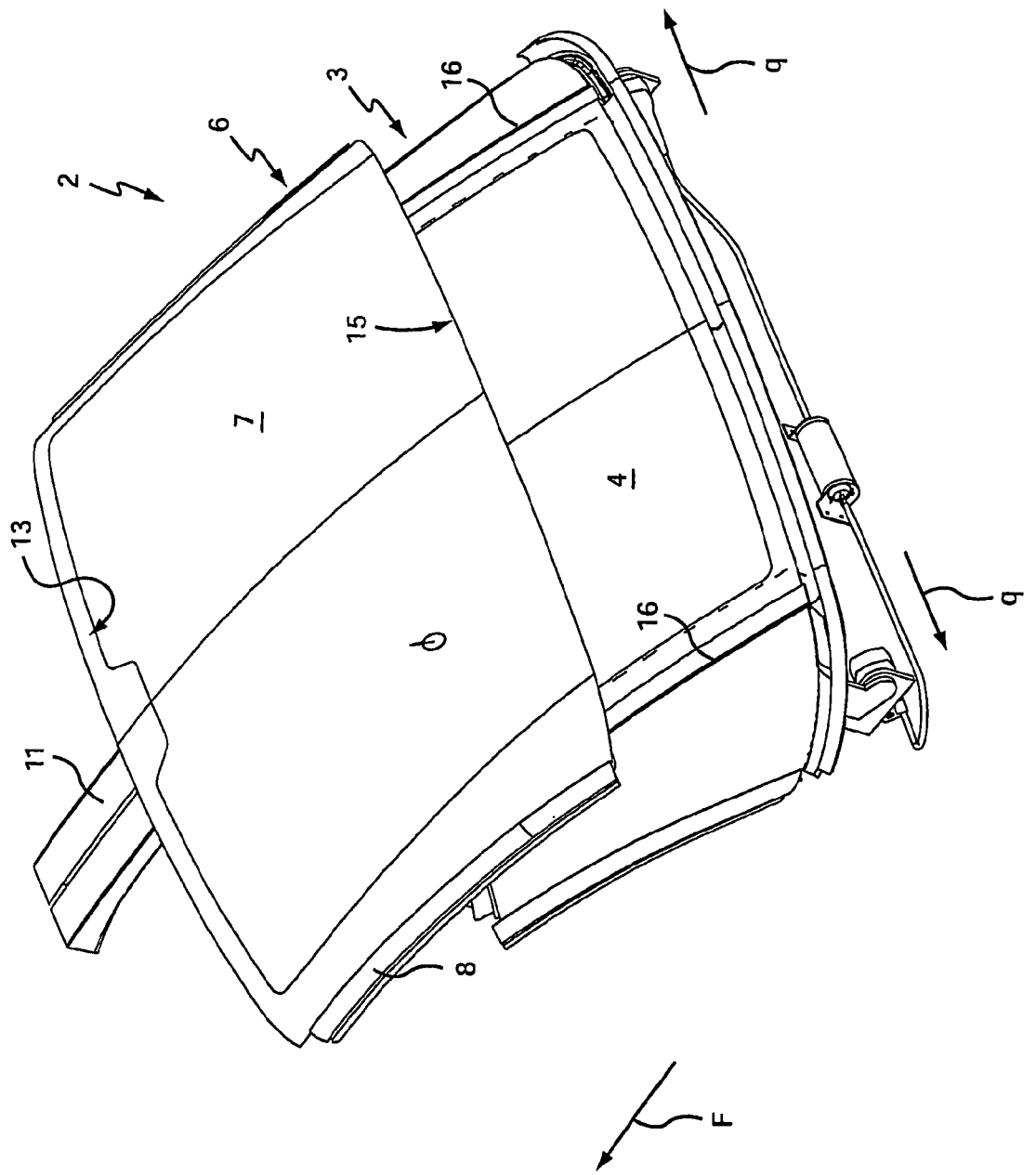
FIG. 4 is a similar view to FIG. 3 during the further progressing opening of the part.
Figure 5:
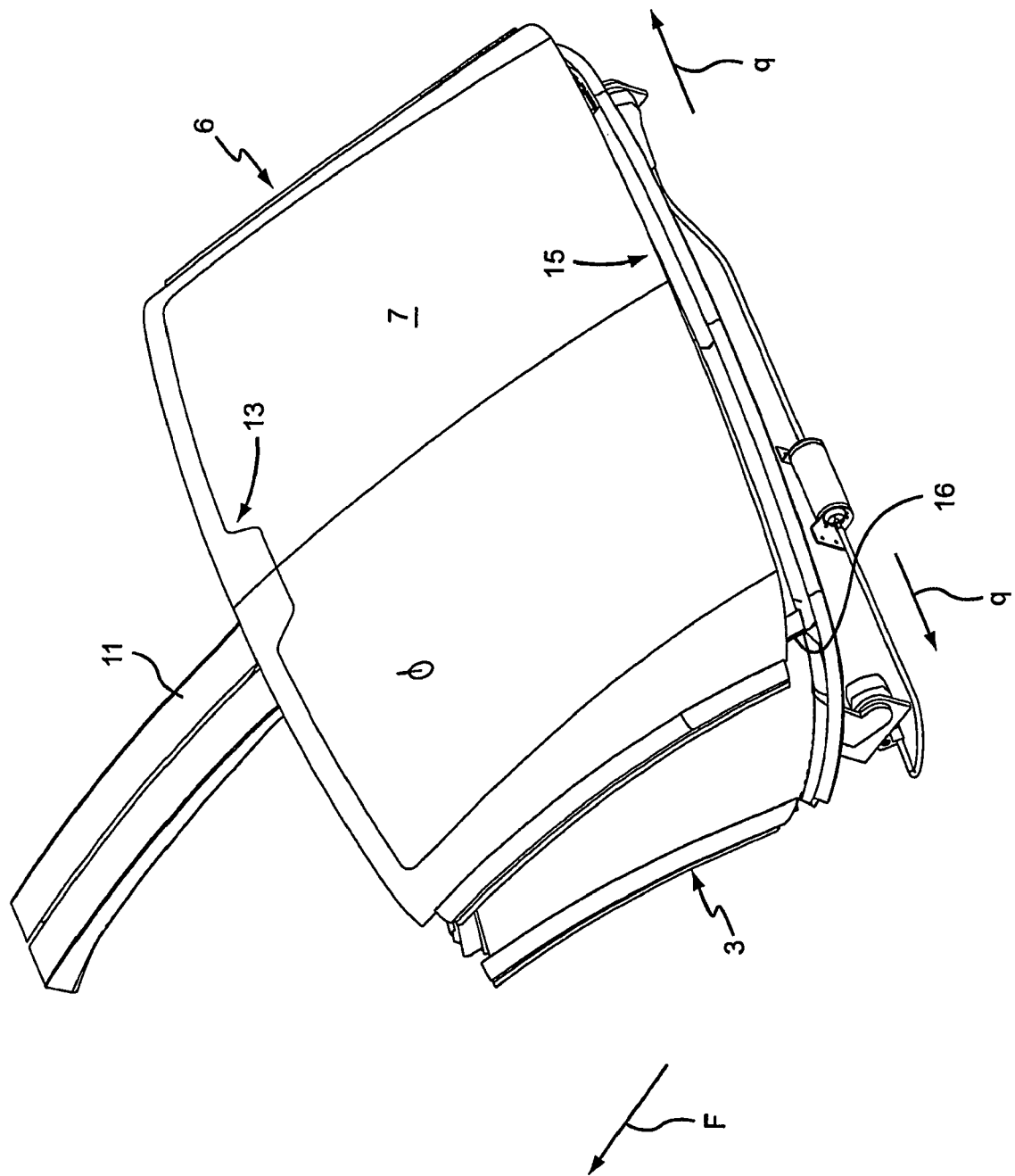
FIG. 5 is a similar view to FIG. 4 with an open part and a still closed rear roof portion.
Figure 6:
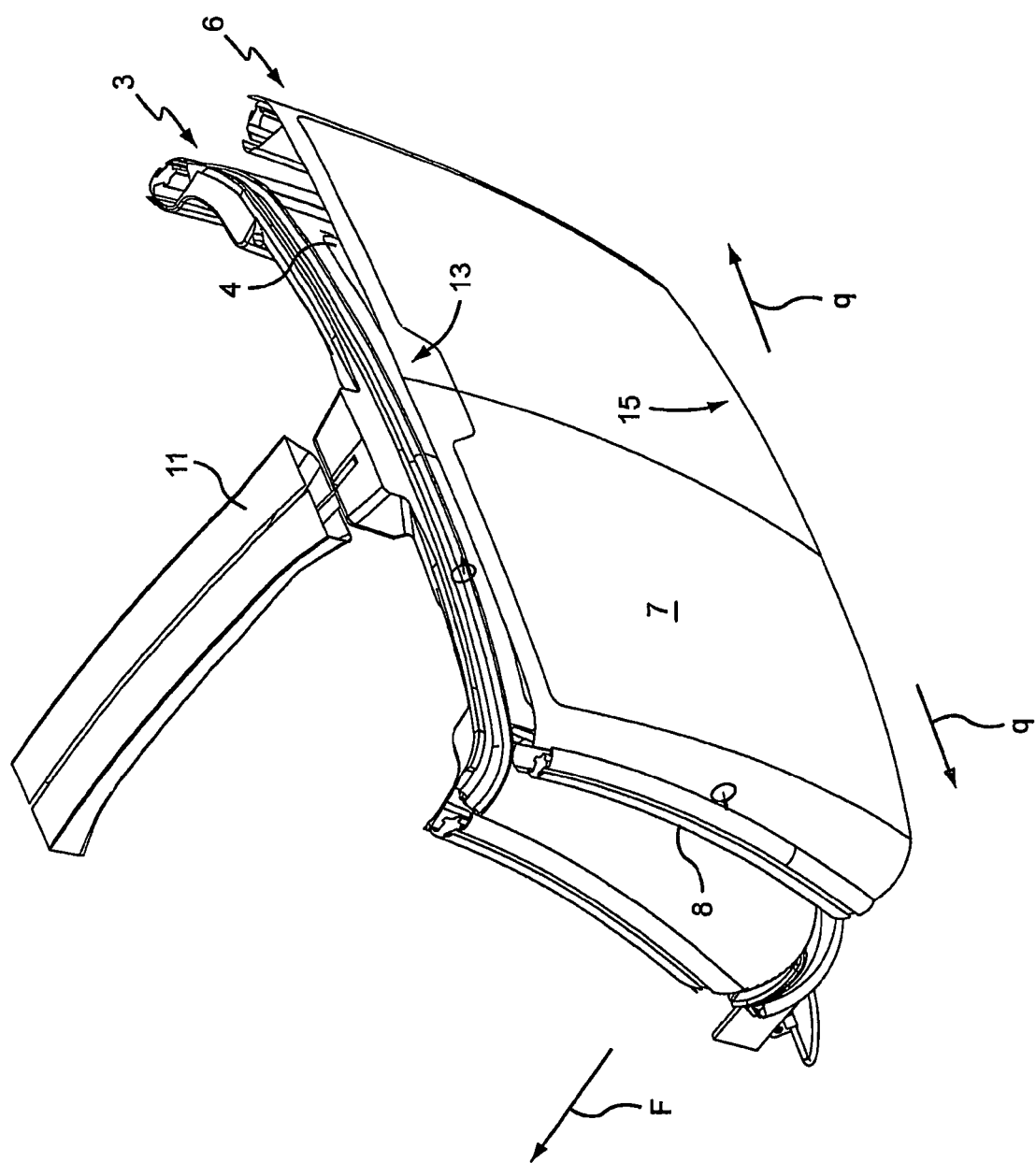
FIG. 6 is a similar view to FIG. 5 during the opening of the rear roof portion and the inward pivoting of the side member with respect thereto for the generation of a full convertible roof position.
Figure 7:
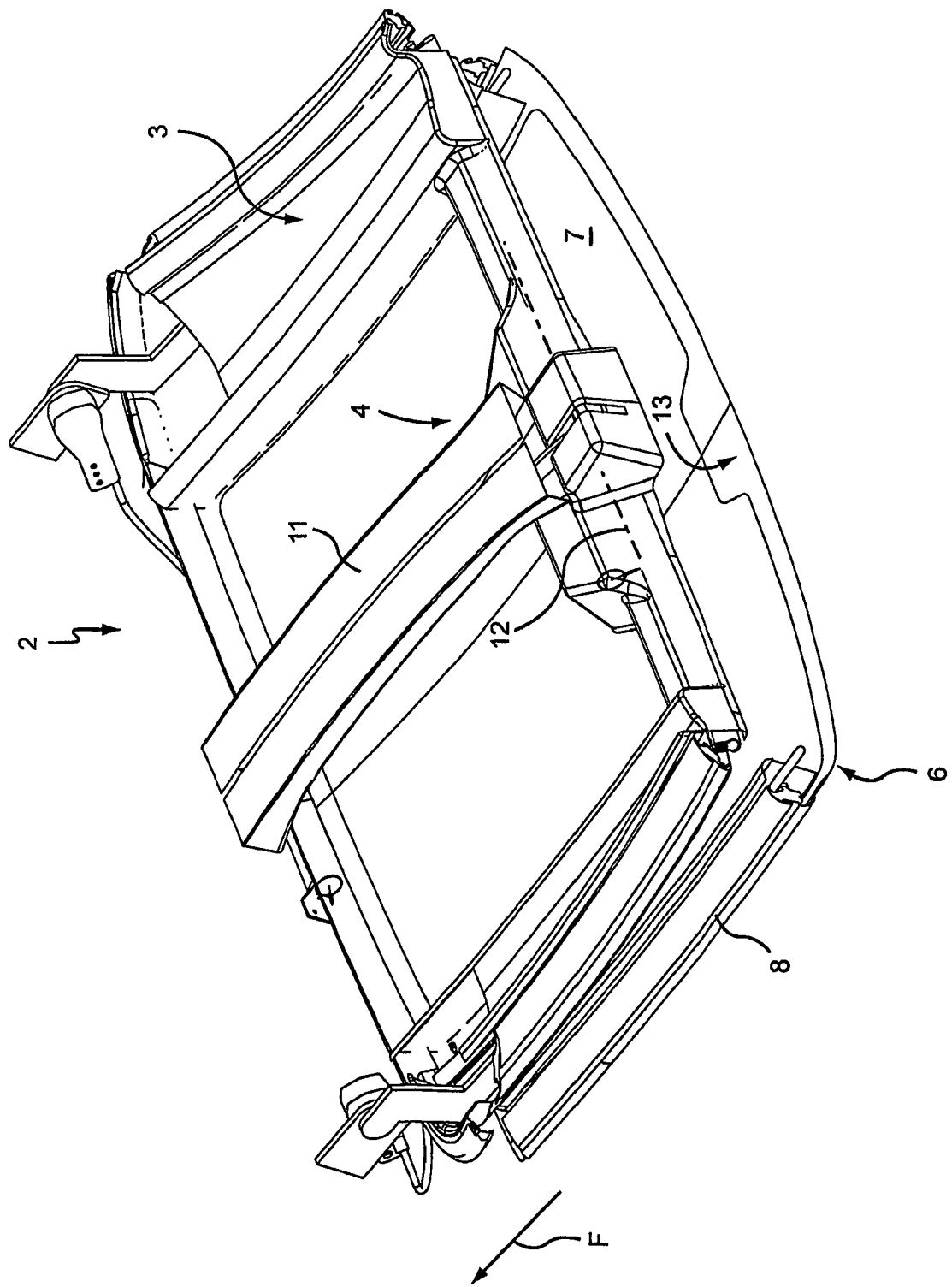
FIG. 7 is a similar view to FIG. 6 with a completely stowed roof with a rear roof portion and side member supported parallel to one another.

In this connection, the plate part 7 can be rearwardly deployed out of the closed position in which it lies flush with the front edge 5 of the rear roof portion 3 and is displaceable over the roof portion 3 disposed to the rear thereof such that it is disposed substantially parallel on the rear window 4 in its open position (FIG. 4 ff.). The position formed in this way represents a possible permanent travel position. A further roof opening with a downward displacement of the roof parts 3, 7 then disposed over one another as a packet can then, however, take place out of it in order to lower said roof parts inside the car body. With a completely open plate part 7, the front holder 14 is also transferred to the rear roof portion 3 so that the side member 11 then no longer satisfies a holding function for the plate part 7. The plate part 7 is then disposed parallel to and above the rear window 4 with a closed rear roof portion 3. The side member 11 can then pivot inwardly around the axis 12 after unlatching from the windshield frame 10. This can run simultaneously with the pivot movement of the rear roof portion 3 for its stowing in the vehicle 1 so that the side member never projects further downwardly into the passenger compartment than in the closed roof position (FIG. 5, FIG. 6). When the rear window 4 is arched such that its central region projects further rearwardly in the closed position than its edges at the outer side in the transverse direction q, which is usual at least with sedan vehicles, the inwardly pivoting side member 11 is received in the arch of the rear roof portion 3 so that the total packet of the stowed roof 2 has a very small thickness extent and only slightly restricts the stowage volume of the trunk. The length of the roof packet is also not increased when the side member 11 is shorter than the vertical extent of the rear roof portion 3 along the plane of the rear window 4. The side member 11 can then be completely received in the arch, which represents a particular advantage with respect to the packed dimension.

If the plate part 7 directly adjoins the windshield frame 10, a very large roof opening is already possible in the intermediate position with only an open plate part 7 not only in the transverse direction up to the side window breastline edges, but also in the longitudinal direction between the windshield frame 10 and the front edge 5 of the rear roof portion 3. A stepped or stepless movement of the plate part 7 can be possible during the journey.

A design of the front roof portion 6 which is outwardly uniform and so visually very advantageous can be achieved if the plate part 7 engages over the side member 11 and extends continuously integrally up to the side windows 9. The marginal regions can also, for example, be offset in a dark manner by films or color in a substantially transparent configuration of the plate part 7 in order to limit the light incident into the passenger compartment.

Alternatively, two plate parts (not shown) can also be provided next to one another which are separated from one another by the side member 11. They can also be individually movable so that, for example, a plate part is open above the driver and a plate part is closed above the front passenger. For this purpose, the plate parts can be guided at the side member 11 and at the rear roof portion 3, with the guidance also being able to be variable in the manner of a telescopic extension during the movement so that no part of the guidance interrupts the view through the rear window 4 with closed plate parts.

For any possible displacement of one or two plate part(s) 7 beneath the rear window 4, laterally outwardly disposed regions of the part(s) can also be folded out around longitudinal axes, whereby they can have a wider width in the closed position than during their opening and thus also permit the displacement into a narrower rear roof portion 3.

The invention is applicable both in vehicles having roof parts 3, 6, 7 to be moved manually and with a fully automatic or partially automatic movability of the parts. Depending on the transfer mechanism of the rear holders 16 to the rear roof portion 3, it can be possible to open the roof 2 in total not only with an open part, but also with a closed plate part 7 capable of opening.

In any case, both a complete roof opening, including the side member 11, and a partial opening of the plate part(s) 7 to be opened separately is possible so that at least two different roof opening positions result. It can also be possible to open the plate part 7 in steps or steplessly in part.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A convertible vehicle comprising:
at least two roof portions which are sequential with respect to the direction of travel in the closed roof position, at least one forward portion of the roof portions being movable rearwardly with respect to a rear roof portion, with the rear roof portion being in a closed position; and
a support member extending between a windshield frame of the vehicle and the rear roof portion in a closed position, the support member being disposed in a region of a vertical longitudinal central plane of the vehicle;
wherein the movable at least one forward portion of the roof portions extends, in a closed position, transversely between outer edges that define the side edges of the roof of the vehicle.

2. A convertible vehicle in accordance with claim 1, wherein the rear roof portion can be moved to a stowed position when the at least one forward portion of the roof portions is displaced rearwardly.

3. A convertible vehicle in accordance with claim 1, wherein a front end of the at least one forward portion of the roof portions is movably supported in its closed position on the support member and a rear end of the at least one forward portion of the roof portions is movably supported via at least one holder disposed close to its outer edge on a roof portion disposed to the rear thereof.

4. A convertible vehicle in accordance with claim 3, wherein the front end of the at least one forward portion of the roof portions is guided by the support member in a first phase of its opening movement and is transferred to a roof portion disposed to the rear thereof in the completely open position.

5. A convertible vehicle in accordance with claim 1, wherein the at least one forward portion of the roof portions extends over the whole passenger compartment width and engages over the support member in its closed position.

6. A convertible vehicle in accordance with claim 1, wherein the at least one forward portion of the roof portions comprises two parts provided next to one another and separate from the support member.

7. A convertible vehicle in accordance with claim 1, wherein the at least one forward portion of the roof portions is an at least substantially transparent plate body.

8. A convertible vehicle in accordance with claim 1, wherein the support member can be pivoted inwardly with respect to a roof portion disposed to the rear thereof around an axis disposed transversely to the vehicle during the opening of the total roof for the stowing in the rearward part of the convertible vehicle.

9. A convertible vehicle in accordance with claim 1, wherein the at least two roof portions comprises precisely two sequential roof portions and the longitudinal extent of the support member is smaller than the vertical extent of the rear roof portion.

10. A convertible vehicle in accordance with claim 1, wherein the roof can be opened in total either with the at least one forward portion of the roof portions in an open or a closed position.

11. A convertible vehicle comprising:
a windshield;
a passenger compartment adjacent to the windshield;
a roof having first and second roof portions movable to a closed position in which the roof portions extend over the passenger compartment, the first roof portion extending between the windshield and the second roof portion in the closed position;
a support member disposed along a substantially longitudinal central plane of the vehicle and extending longitudinally between the windshield and the second roof portion, the support member supporting the first roof portion in the closed position and guiding movement of the first roof portion between the closed position and an open position disposed along an outer surface of the second roof portion, the support member further having one end pivotally coupled to the second roof portion for movement of the support member between an extended position extending between the windshield and second roof portion and a retracted position disposed along an inner surface of the second roof portion.

12. A convertible vehicle as set forth in claim 11, wherein the support member is releasably locked to the windshield in the closed position.

13. A convertible vehicle as set forth in claim 11 including an actuator for driving the support member between the extended and retracted positions.

14. A convertible vehicle as set forth in claim 11, wherein the first roof portion has one end guided by the support member and an opposite end slidably coupled to a longitudinally extending track on the second roof portion.

15. A convertible vehicle as set forth in claim 14, wherein the first roof portion is slidably coupled to a pair of longitudinally extending tracks on the second roof portion, the tracks being spaced apart in a generally transverse direction in the vehicle.

16. A convertible vehicle as set forth in claim 11, wherein the first roof portion includes a pair of plate parts arranged generally symmetrically oppositely about the support member, each plate part extending transversely between the support member and a respective side of the vehicle.

17. A convertible vehicle as set forth in claim 16, wherein the plate parts are independently movable between the closed and open positions relative to each other.

18. A convertible vehicle as set forth in claim 11, wherein the second roof portion is disposed between the support member in the retracted position and the first roof portion in the open position.

* * * * *

UNITED STATES PATENT AND TRADEMARK OFFICE
CERTIFICATE OF CORRECTION

PATENT NO. : 8,020,916 B2  Page 1 of 1
APPLICATION NO. : 11/721869
DATED : September 20, 2011
INVENTOR(S) : Winfried Bunsmann et al.

It is certified that error appears in the above-identified patent and that said Letters Patent is hereby corrected as shown below:

In the ABSTRACT: replace "sections;" with --sections--

Signed and Sealed this
Twentieth Day of November, 2012

David J. Kappos
*Director of the United States Patent and Trademark Office*